United States Patent [19]

Kim

[11] Patent Number: 5,662,287

[45] Date of Patent: Sep. 2, 1997

[54] METHOD FOR AUTOMATICALLY ADJUSTING TAPE TRAVELLING SPEED IN A RECORDER

[75] Inventor: Gie-Cheol Kim, Seoul, Rep. of Korea

[73] Assignee: Daewoo Electronics Co, Ltd., Seoul, Rep. of Korea

[21] Appl. No.: 607,481

[22] Filed: Feb. 27, 1996

[30] Foreign Application Priority Data

Mar. 31, 1995 [KR] Rep. of Korea .................. 95-7272

[51] Int. Cl.$^6$ .................................................. G11B 15/44
[52] U.S. Cl. ........................................................ 242/334.3
[58] Field of Search .................................. 242/334, 334.1, 242/334.3, 334.4, 352.5, 354, 356, 356.3; 318/6, 7; 360/96.4

[56] References Cited

U.S. PATENT DOCUMENTS

| | | | |
|---|---|---|---|
| 3,834,648 | 9/1974 | Rose, Jr. et al. | 242/334.1 |
| 4,001,552 | 1/1977 | Muller | 242/357 |
| 4,394,994 | 7/1983 | Oono | 318/6 |
| 4,989,112 | 1/1991 | Hamoda | 242/334.4 |
| 5,125,592 | 6/1992 | Sato | 242/334.4 |
| 5,248,112 | 9/1993 | Rodal et al. | 242/334 |
| 5,275,351 | 1/1994 | Wu et al. | 242/334.4 |

FOREIGN PATENT DOCUMENTS

| | | | |
|---|---|---|---|
| 54-11806 | 1/1979 | Japan | 242/334.3 |
| 62-88768 | 4/1987 | Japan | 242/334.3 |

*Primary Examiner*—John P. Darling
*Attorney, Agent, or Firm*—Anderson Kill & Olick P.C.

[57] ABSTRACT

A method for automatically adjusting the running speed of the magnetic tape during FF and RW modes of operation for use in a recorder such as a VCR comprises the steps of determining if the VCR is in a FF or a RW mode, determining the total length L of the magnetic tape, determining a tape remainder R representing the amount of tape remaining wound around a supply or a take-up reel, adjusting a rotational rate of a capstan motor incorporated in the VCR, and detecting whether the beginning or the end part of the tape has been reached.

8 Claims, 3 Drawing Sheets

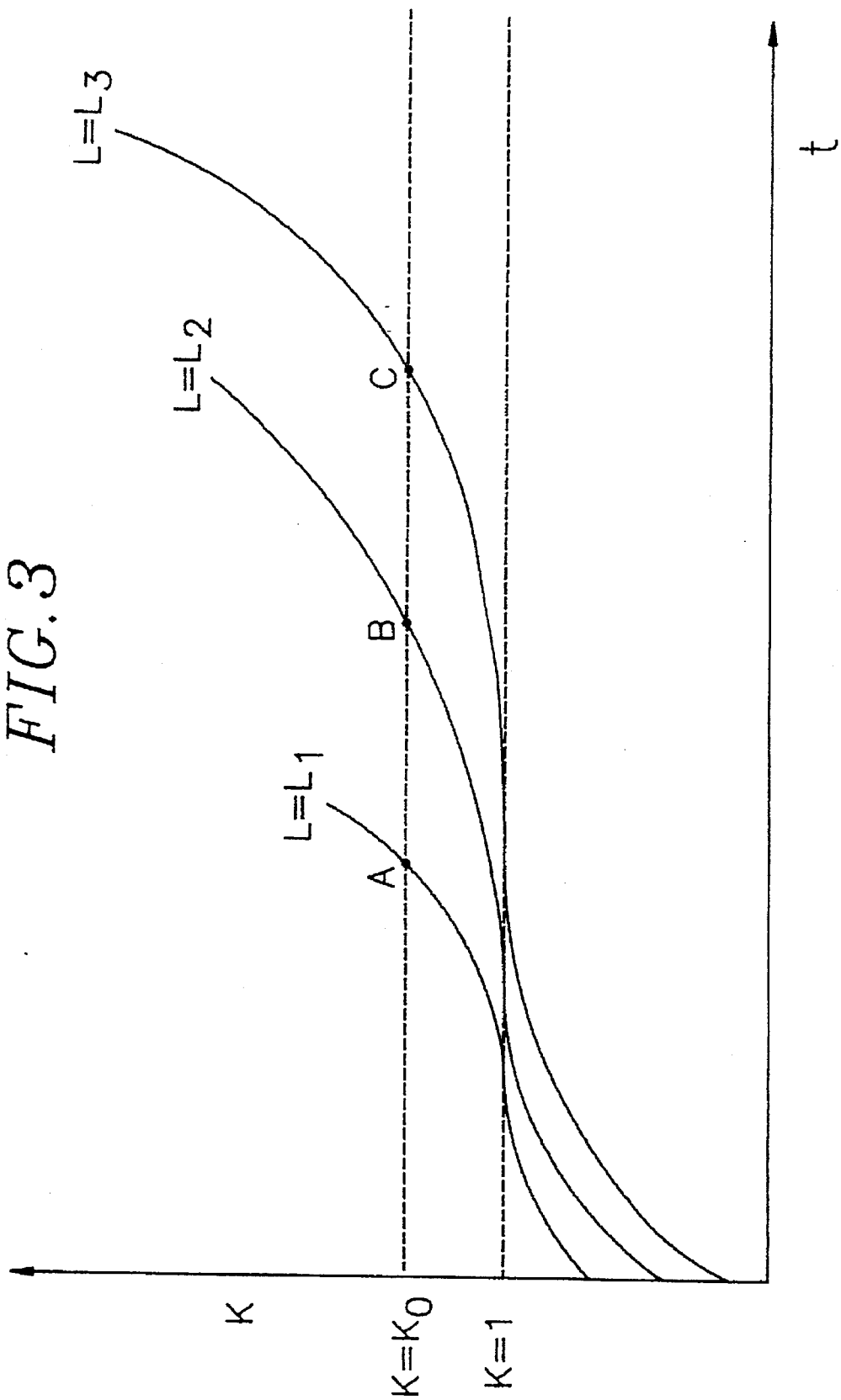

5,662,287

METHOD FOR AUTOMATICALLY ADJUSTING TAPE TRAVELLING SPEED IN A RECORDER

FIELD OF THE INVENTION

The present invention relates to a method for automatically adjusting a running speed of a magnetic tape loaded in a recorder such as a video cassette recorder, and, more particularly, to a method for adjusting the running speed of the tape based on the amount of the tape that remains wound around a supply or a take-up reel during a rewind or a fast forward operation.

DESCRIPTION OF THE PRIOR ART

As is well known, a video cassette recorder ("VCR") is capable of performing a rewind ("RW") or a fast forward ("FF") operation. In the RW operation, a magnetic tape of a video cassette loaded in the VCR is rapidly transferred from a take-up reel to a supply reel. Conversely, in the FF operation, the VCR moves the magnetic tape from the supply reel to the take-up reel at an accelerated speed.

As is also well known, the magnetic tape in a video cassette includes a transparent portion at the beginning and at the end, respectively. A tape start sensor incorporated in the VCR generates a tape start signal when it detects the transparent portion at the beginning of the tape. Similarly, the transparent portion at the end of the tape allows a tape end sensor to generate a tape end signal when the end of the tape is sensed In the conventional VCR, the rotational rate at which the take-up reel rotates during the FF operation is kept constant until the end of the tape is reached, or, until the tape end sensor generates the tape end signal. Likewise, during the RW operation, the supply reel rotates at a constant rotational rate until the tape start sensor generates the tape start signal indicating the beginning of the tape. In other words, once the RW or FF operation is begun, the rotational rate of the reel that the tape is being transferred to, i.e., the supply reel in case of the RW operation and the take-up reel in case of the FF operation, remains constant until the tape transfer is completed. Thus, because the tape travels at a high speed and stops abruptly in response to the tape end or tape start signal, there is a possibility that the magnetic tape may be damaged as a result of the sudden stop at the end of the FF or the RW operation.

SUMMARY OF THE INVENTION

It is, therefore, a primary object of the present invention to provide a method for automatically adjusting a running speed of a magnetic tape loaded in a recorder during the FF and RW operations of the recorder.

In accordance with a preferred embodiment of the present invention, there is provided a method for automatically adjusting a running speed of a magnetic tape loaded in a recorder such as a VCR, wherein the recorder includes a capstan motor, a supply reel, a take-up reel, and means for generating a supply reel signal representing a rotational rate of the supply reel, a take-up reel signal representing a rotational rate of the take-up reel, and a motor speed signal representing a rotational rate of the capstan motor, the method comprising the steps of: (a) detecting if the RW or the FF mode of operation has been selected; (b) rewinding or fast forwarding the tape by rotating the capstan motor at a predetermined speed S, depending on whether the VCR is in the RW or the FF mode of operation; (c) determining a total length L of the magnetic tape from the take-up reel signal and the supply reel signal; (d) computing a tape remainder R, representing the amount of the tape that remains wound around either the supply or the take up reel, based on the supply reel signal, the take-up reel signal, and the total length L obtained in said step (c); (e) calculating a desired speed DS corresponding to the tape remainder R obtained in said step (d); (f) computing a current rotating speed CS of the capstan motor based on the motor speed signal, and calculating a difference D between the desired speed DS obtained in said step (e) and the current rotating speed CS; (g) if the difference D is larger than a predetermined threshold difference $D_r$, outputting a capstan motor signal to thereby rotate the capstan motor at the desired speed DS, and if the difference D is smaller than or equal to the predetermined threshold difference $D_r$, outputting the capstan motor signal to thereby rotate the capstan motor at the current rotating speed CS; and (h) repeating the above steps (d) through (g) until the selected RW or FF operation is complete.

BRIEF DESCRIPTION OF THE DRAWINGS

The above and other objects and features of the present invention will become apparent from the following description in conjunction with the accompanying drawings, in which:

FIG. 3 sets forth a graph for explaining the tape remainder determination process utilized in the inventive method for automatically adjusting the running speed of the magnetic tape.

DETAILED DESCRIPTION OF THE PREFERRED EMBODIMENTS

Figure 1:
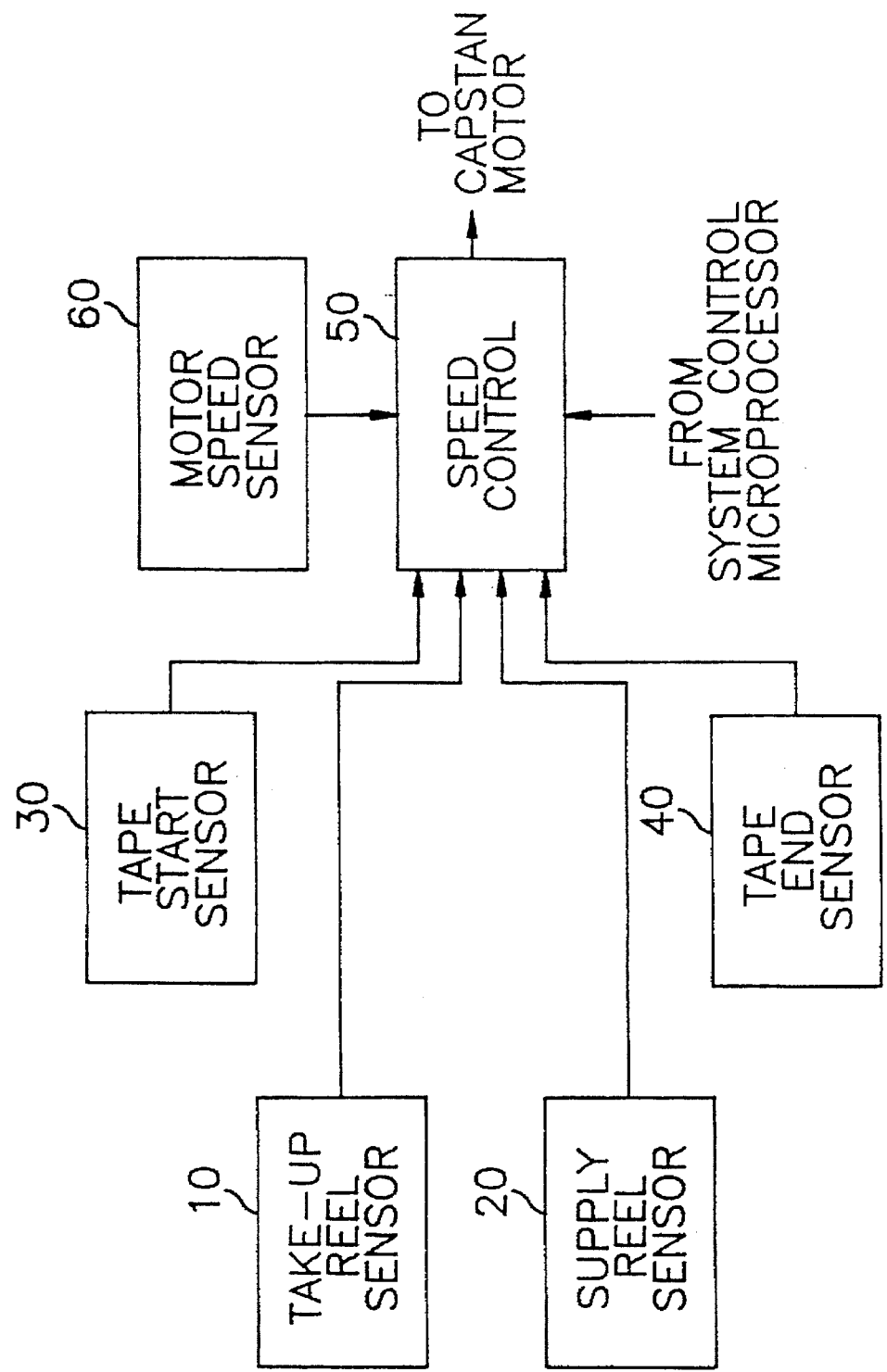
FIG. 1 shows a block diagram of an apparatus for automatically adjusting the running speed of the magnetic tape for use in a VCR.

Referring to FIG. 1, there is shown a block diagram of an apparatus, for use in a VCR, capable of automatically adjusting a running speed of a magnetic tape during a FF or a RW operation based on the amount of the tape wound around a supply or a take-up reel (not shown) in accordance with the present invention. The apparatus comprises a take-up reel sensor 10, a supply reel sensor 20, a tape start sensor 30, a tape end sensor 40, a speed control block 50, and a motor speed sensor 60.

The take-up reel sensor 10 is coupled to the take-up reel and generates a predetermined number of pulses per rotation of the take-up reel, thereby producing a take-up reel signal whose pulse frequency is proportional to a rotation rate of the take-up reel. The take-up reel signal thus produced is provided to the speed control block 50. Likewise, the supply reel sensor 20, coupled to the supply reel, produces a supply reel signal representative of a rotation rate of the supply reel, and provides it to the speed control block 50.

The tape start sensor 30 generates a tape start signal by detecting a transparent portion provided at the beginning part of the magnetic tape; and the tape end sensor 40 generates a tape end signal by detecting a transparent portion provided at the end of the magnetic tape. The tape start and tape end signals are both provided to the speed control block 50.

In addition, the speed control block 50 receives a motor speed signal from the motor speed sensor 60 and a VCR mode signal from a system control microprocessor (not shown). The motor speed signal generated by the motor speed sensor which is coupled to a capstan motor (not shown) that drives the take-up or the supply reel during the FF or the RW operation, reflects a rotational rate of the capstan motor. The VCR mode signal allows the speed control block 50 to detect the operating mode the VCR is in at a given instant.

In accordance with the present invention, the speed control block 50 first determines the amount of a tape remaining wound around a reel based on the reel sensor signals and controls the running speed by generating appropriate capstan motor signals to thereby adjust the rotational rate of the capstan motor.

Figure 2:
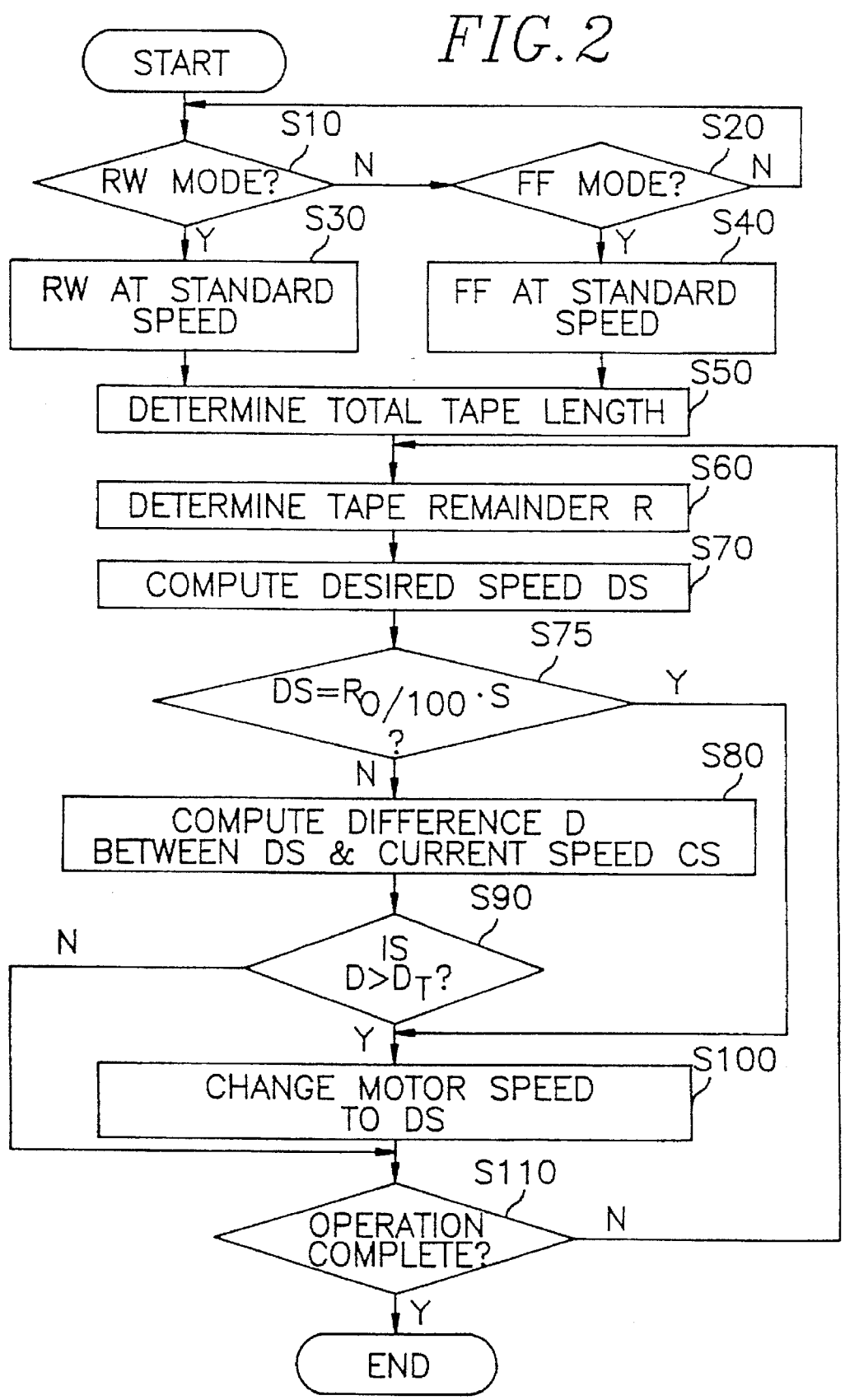
FIG. 2 presents a flowchart illustrating an inventive method for automatically adjusting the running speed of the magnetic tape for use in a VCR.

Referring to FIG. 2, there is illustrated a flowchart for explaining a process carried out in the speed control block 50 for automatically adjusting the running speed of the magnetic tape during the FF or the RW operation.

First, in step S10, the speed control block 50 checks the VCR mode signal from the system control microprocessor to determine whether the RW mode has been selected. If the speed control block 50 detects from the VCR mode signal that the RW operation has been selected by a user, the process proceeds to step S30, wherein the speed control block 50 generates an appropriate capstan motor signal to thereby rotate the capstan motor at a predetermined speed S.

On the other hand, if the RW mode has not been selected, the process proceeds to step S20 from step S10 and determines whether a FF mode has been activated. If the speed control block 50 detects from the VCR mode signal that the FF operation has been selected by the user, the process continues on to step S40, wherein the speed control block 50 generates an appropriate capstan motor signal to thereby fast forward the tape by rotating the capstan motor at a predetermined speed S.

Then, after the RW or the FF operation has begun in step S30 or S40, the process proceeds to step S50, wherein the speed control block 50 determines a total length L of the magnetic tape of a video cassette loaded in the VCR based on the take-up reel signal and the supply reel signal. In particular, the speed control block 50 determines a ratio K between the radius of a cylinder consisting of the supply reel and the tape wound thereon and the radius of a cylinder consisting of the take-up reel and the tape wound thereon by measuring the pulse frequency of the supply reel signal and the pulse frequency of the take-up reel signal. K is defined by the following equation:

$$K = f_t/f_s = r_s/r_t \qquad \text{Eq. 1}$$

wherein $r_s$ is the radius of the cylinder consisting of the supply reel and the tape wrapping around it, $r_t$ is the radius of the cylinder consisting of the take-up reel and the tape wrapping around it, $f_s$ is the pulse frequency of the supply reel signal, and $f_t$ is the pulse frequency of the take-up reel signal.

Next, the speed control block 50 measures the rate of change of the ratio K by measuring the rate of change of the frequencies $f_t$, $f_s$ of the take-up reel signal and the supply reel signal, respectively. The speed control block 50 determines the total length L of the magnetic tape by using a look-up table of the ratio K and the change rate of the ratio K. FIG. 3 explains this by plotting the ratio K against time during the RW operation for three video cassettes having magnetic tapes of different lengths. Each curve shows how the ratio K changes with time for a video cassette of a predetermined different length, i.e., $L_1$, $L_2$, or $L_3$. As can be seen, the ratio K alone does not provide sufficient information to allow the determination of the total length L of the tape in the video cassette, since, for a given value of K, each of the three curves may have a point showing that value. However, the ratio K and the rate of change of the ratio K together can be used to determine the length of the tape, since the rate of change of the ratio K at a particular value of K varies with the length of a tape. This can be seen from FIG. 3 by observing that although each curve has a point where the ratio K has the value $K_0$, the rate of change of K, i.e., the slope of the curve, is different at points A, B, and C. Since video cassettes are available in a limited number of predetermined lengths, data on the limited number of curves is sufficient and can be stored in a look-up table, and the speed control block 50 will only need to measure the ratio K and its rate of change and determine which curve they fit. It should be noted, however, that this method does not work near the beginning or the end of the tape, nor where K has a value of 1. At such points, the speed control block 50 is made to wait for a point where the above method works.

Once the total length L of the magnetic tape has been determined, the process proceeds to step S60, wherein the speed control block 50 computes the tape remainder R from the total tape length L computed in step S50, the take-up reel signal, and the supply reel signal, as described below. Although, for the purpose of the present discussion, the tape remainder R is set to represent the amount of tape wound around the supply reel, it should be noted that it is also possible to compute and use the amount of tape wound around the take-up reel.

The tape remainder R represents a percentage of the total length L of the tape wrapping around the supply reel. The tape remainder R can be obtained from the following equation:

$$R = 100(\pi r_s^2 - \pi r_r^2)/(T_t L) \qquad \text{Eq. 2}$$

wherein $r_r$ is the radius of the supply or the take-up reel alone, $T_t$ is the thickness of the magnetic tape, and L is the total length of the magnetic tape. It should be noted that $r_r$ and $T_t$ are measurable constants. However, $r_s$ may be obtained from the following equation:

$$\pi r_s^2 + \pi (r_s/K)^2 - 2\pi r_r^2 T_t L \qquad \text{Eq. 3}$$

since $$r_s/K = r_t$$

Next, in step S70, the speed control block 50 computes a desired speed DS based on the tape remainder R. The desired speed DS represents a fraction of the predetermined speed S that the capstan motor should be rotating at, and may be obtained, in case of the FF operation, from the following equation:

$$DS = R/100 \times S, \quad \text{if } R > R_0, \qquad \text{Eq. 4}$$
$$DS = R_0/100 \times S, \quad \text{otherwise.}$$

wherein $R_0$ is a predetermined arbitrary constant.

On the other hand, if the VCR is in the RW mode, the desired speed DS may be obtained from the following equation:

$$DS = (100 - R)/100 \times S, \quad \text{if } 100 - R > R_0, \qquad \text{Eq. 5}$$
$$DS = R_0/100 \times S, \quad \text{otherwise.}$$

It should be noted that the constant $R_0$ ensures that the magnetic tape will continue to travel, albeit at a lower speed, when the FF or RW operation is almost complete, but has not yet reached the end or the beginning part of the tape.

In the alternative, it may be preferable to let the capstan motor rotate at the predetermined speed S until the RW or the FF operation is almost complete. In this case, the desired speed DS may be defined, for the FF operation, by the following equation:

$$DS = S, \quad \text{if } R > R_1,$$
$$DS = (R/R_1) \times S, \quad \text{if } R_1 \geq R > R_0,$$
$$DS = R_0/100 \times S, \quad \text{otherwise.}$$

Eq. 6 wherein $R_1$ is also a predetermined arbitrary constant. Similarly, if the VCR is in the RW mode, the desired speed DS may be given by the following equation:

$$DS = S, \quad \text{if } 100 - R > R_1$$
$$DS = (100 - R)/R_1 \times S, \quad \text{if } R_1 \geq 100 - R > R_0,$$
$$DS = R_0/100 \times S, \quad \text{otherwise.}$$

Eq. 7

Thus, the speed control block 50 outputs the predetermined speed S as the desired speed DS until a predetermined portion $R_1$ of the tape remains wound around the take-up or the supply reel.

The process then continues to step S75, wherein the speed control block 50 determines whether the desired speed DS computed in said step S70 is equal to a predetermined minimum motor speed $R_0/100 \times S$. If the desired speed DS equals the minimum motor speed, indicating that the RW or the FF operation is almost complete, and that the capstan motor should be rotated at the minimum motor speed, the process then proceeds to step S100 instead of continuing on to step S80.

However, if the desired speed DS computed in said step S70 is not equal to the minimum motor speed, the process proceeds to step S80, wherein a current rotating speed CS is computed from the motor speed signal generated by the motor speed sensor 60, and used to calculate a difference D according to the following equation:

$$D = |CS - DS| \quad \text{Eq. 8}$$

The speed control block 50 then compares the difference D with a predetermined threshold difference $D_t$ in step S90. If the difference D is smaller than or equal to the predetermined threshold difference $D_t$, the speed control block 50 proceeds to step S110 without adjusting the speed of the capstan motor.

However, if the difference D is larger than the threshold difference $D_t$, the speed control block 50 first proceeds to step S100 and changes the speed of the capstan motor to the desired speed by generating and outputting an appropriate capstan motor signal before continuing to step S110.

In step S110, the speed control block 50 checks whether the RW or the FF operation is complete, and if so, stops the RW or the FF operation. Thus, if the VCR is in the RW mode and the tape start signal is received from the tape start sensor, or if the VCR is in the FF mode and the tape end signal is received, the speed control block 50 terminates the RW or the FF operation. If the RW or the FF operation is not complete, the speed control block 50 returns to step S60.

While the present invention has been shown and described above with respect to the particular embodiments, it will be apparent to those skilled in the art that many changes, alterations and modifications may be made without departing from the spirit and scope of the invention as defined in the appended claims.

What is claimed is:

1. A method for automatically adjusting a running speed of a magnetic tape during fast forward ("FF") and rewind ("RW") modes of operation in a recorder, wherein the recorder includes a capstan motor, a supply reel, a take-up reel, and means for generating a supply reel signal representing a rotational rate of the supply reel, a take-up reel signal representing a rotational rate of the take-up reel, and a motor speed signal representing a rotational rate of the capstan motor, the method comprising the steps of:

(a) detecting if the RW or the FF mode of operation has been selected;

(b) rewinding or fast forwarding the tape by rotating the capstan motor at a predetermined speed S, depending on whether the recorder is in the RW or the FF mode of operation;

(c) determining a total length L of the magnetic tape from the take-up reel signal and the supply reel signal;

(d) computing a tape remainder R, representing the amount of the tape that remains wound around either the supply or the take-up reel, based on the supply reel signal, the take-up reel signal, and the total length L obtained in said step (c);

(e) calculating a desired speed DS corresponding to the tape remainder R obtained in said step (d);

(f) computing a current rotating speed CS of the capstan motor based on the motor speed signal, and calculating a difference D between the desired speed DS obtained in said step (e) and the current rotating speed CS;

(g) if the difference D is larger than a predetermined threshold difference $D_t$, outputting a capstan motor signal to thereby rotate the capstan motor at the desired speed DS, and if the difference D is smaller than or equal to the predetermined threshold difference $D_t$, rotating the capstan motor at the current rotating speed CS; and (h) repeating the above steps (d) through (g) until the RW or the FF mode of operation is completed.

2. The method of claim 1, wherein in said step (c) the total length L is obtained by measuring a ratio K defined by Eq. 1, a rate of change of the ratio K, and by using a look-up table containing the total length L data that matches the ratio K and the rate of change:

$$K = f_t/f_s \quad \text{Eq. 1}$$

wherein $f_s$ is a frequency of the supply reel signal and $f_t$ is a frequency of the take-up reel signal.

3. The method of claim 2, wherein the tape remainder R in said step (d) represents the amount of the tape wrapping around the supply reel expressed in percentile, and is defined by the following equation:

$$R = 100(\pi r_s^2 - \pi r_r^2)$$

wherein $r_s$ is a radius of a cylinder consisting of the supply reel and the amount of tape wrapping around it, and is obtained from the following equation:

$$\pi r_s^2 + \pi (r_s/K)^2 - 2\pi r_r^2 = T_t L$$

wherein $r_r$ is the radius of the supply reel alone, $T_t$ is a thickness of the magnetic tape, and L is the total length obtained in said step (c).

4. The method of claim 3, wherein the tape remainder R in said step (d) represents the amount of the tape wrapping around the take-up reel expressed in percentile, and is defined by the following equation:

$$R = 100(\pi r_t^2 - \pi r_r^2)/(T_t L)$$

wherein $r_t$ is a radius of a cylinder consisting of the take-up reel and the amount of tape wrapping around it, and is obtained from the following equation:

$$\pi r_r^2 + \pi (K r_t)^2 - 2\pi r_r^2 = T_t L.$$

5. The method of claim 3, wherein in said step (e), if the recorder is in the FF mode, the desired speed DS is computed from the following equation:

$$DS = R/100 \times S, \quad \text{if } R > R_0,$$
$$DS = R_0/100 \times S, \quad \text{otherwise}$$

wherein $R_0$ is an arbitrary constant having a value between 0 and 100; and if the recorder is in the RW mode, the desired speed DS is computed from the following equation:

$$DS = (100 - R)/100 \times S, \quad \text{if } 100 - R > R_0,$$
$$DS = R_0/100 \times S, \quad \text{otherwise.}$$

6. The method of claim 5, wherein in said step (e), if the recorder is in the FF mode, the desired speed DS is computed from the following equation:

$$DS = S, \quad \text{if } R > R_1,$$
$$DS = (R/R_1) \times S, \quad \text{if } R_1 \geq R > R_0,$$
$$DS = R_0/100 \times S, \quad \text{otherwise}$$

wherein $R_1$ is an arbitrary constant having a value between $R_0$ and 100; and if the recorder is in the RW mode, the desired speed DS is computed from the following equation:

$$DS = S, \quad \text{if } 100 - R > R_1$$
$$DS = (100 - R)/R_1 \times S, \quad \text{if } R_1 \geq 100 - R > R_0,$$
$$DS = R_0/100 \times S, \quad \text{otherwise.}$$

7. The method of claim 6, wherein in said step (e), if the recorder is in the RW mode, the desired speed DS is computed from the following equation:

$$DS = S, \quad \text{if } R > R_1,$$
$$DS = (R/R_1) \times S, \quad \text{if } R_1 \geq R > R_0,$$
$$DS = R_0/100 \times S, \quad \text{otherwise}$$

and if the recorder is in the FF mode, the desired speed DS is computed from the following equation:

$$DS = S, \quad \text{if } 100 - R > R_1$$
$$DS = (100 - R)/R_1 \times S, \quad \text{if } R_1 \geq 100 - R > R_0,$$
$$DS = R_0/100 \times S, \quad \text{otherwise.}$$

8. The method of claim 5, wherein, in said step (e), if the recorder is in the RW mode, the desired speed DS is computed from the following equation:

$$DS = R/100 \times S, \quad \text{if } R > R_0,$$
$$DS = R_0/100 \times S, \quad \text{otherwise}$$

and if the recorder is in the FF mode, the desired speed DS is computed from the following equation:

$$DS = (100 - R)/100 \times S, \quad \text{if } 100 - R > R_0,$$
$$DS = R_0/100 \times S, \quad \text{otherwise.}$$

* * * * *